US007637548B2

(12) United States Patent
Fukano et al.

(10) Patent No.: US 7,637,548 B2
(45) Date of Patent: Dec. 29, 2009

(54) VACUUM SUCTION APPARATUS HAVING NEGATIVE PRESSURE ACTUATED VACUUM GENERATOR SWITCHING MECHANISM

(75) Inventors: Yoshihiro Fukano, Moriya (JP); Shoichi Makado, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/960,697

(22) Filed: Dec. 19, 2007

(65) Prior Publication Data

US 2008/0150207 A1 Jun. 26, 2008

(30) Foreign Application Priority Data

Dec. 20, 2006 (JP) ............................ 2006-342709

(51) Int. Cl.
*B25J 15/06* (2006.01)
*B66C 1/02* (2006.01)
*F04F 5/00* (2006.01)

(52) U.S. Cl. ...................................... 294/64.1; 417/187

(58) Field of Classification Search ....... 294/64.1–64.3; 417/182, 187; 137/271
See application file for complete search history.

(56) References Cited

U.S. PATENT DOCUMENTS

| | | | | |
|---|---|---|---|---|
| 4,402,651 | A | 9/1983 | Ise | |
| 4,432,701 | A * | 2/1984 | Ise | 294/64.2 |
| 4,865,521 | A * | 9/1989 | Ise et al. | 294/64.2 |
| 6,719,536 | B2 | 4/2004 | Schmalz et al. | |
| 6,955,526 | B2 | 10/2005 | Yamazaki et al. | |
| 7,040,679 | B2 * | 5/2006 | Fukano et al. | 294/64.1 |
| 2008/0078968 | A1 * | 4/2008 | Fukano et al. | 251/122 |

FOREIGN PATENT DOCUMENTS

| | | |
|---|---|---|
| DE | 10116698 | 10/2002 |
| DE | 10118885 | 11/2002 |
| JP | 56-143599 | 10/1981 |
| JP | 60-098200 | 6/1985 |
| JP | 6-31671 | 2/1994 |
| JP | 06-185499 | 7/1994 |
| JP | 11-226679 | 8/1999 |
| JP | 2003-278699 | 10/2003 |

* cited by examiner

*Primary Examiner*—Paul T Chin
(74) *Attorney, Agent, or Firm*—Paul A. Guss

(57) ABSTRACT

A switching valve is disposed between a pressure fluid supply source and an ejector in a vacuum suction apparatus. A supply port of the switching valve is connected to the pressure fluid supply source, and an outlet port of the switching valve is connected to the ejector. In addition, when suction pads attract a workpiece under suction and a negative pressure becomes constant, a valve body is displaced by a negative pressure supplied through a vacuum port to the switching valve, whereupon communication between the supply port and the outlet port is blocked.

6 Claims, 6 Drawing Sheets

VACUUM SUCTION APPARATUS HAVING NEGATIVE PRESSURE ACTUATED VACUUM GENERATOR SWITCHING MECHANISM

BACKGROUND OF THE INVENTION

1. Field of the Invention

The present invention relates to a vacuum suction apparatus for supplying a negative pressure to an operating device such as a suction pad or the like.

2. Description of the Related Art

Heretofore, for example, a vacuum suction apparatus has been known, which is used in workpiece transport mechanisms, positioning mechanisms, and the like. Such a vacuum suction apparatus, as disclosed in Japanese Laid-Open Patent Publication No. 11-226679, includes an ejector that generates a negative pressure from a supplied pressure fluid, the ejector being connected to a suction mechanism made up of a suction pad or the like, whereby a workpiece is attracted under suction by the suction mechanism by the negative pressure generated by the ejector. In addition, transporting of the workpiece is carried out, such that the workpiece is displaced while the attracted state thereof is maintained, and further, the workpiece is released at a predetermined position by releasing the suction state under which the workpiece is attracted.

Incidentally, in general, with this type of vacuum suction apparatus, even after the workpiece has been attracted by the suction mechanism, the pressure fluid is continuously supplied at a fixed amount to the ejector to generate a negative pressure in the ejector. However, since the workpiece has already been attracted under suction by the suction mechanism, further supply of negative pressure from the ejector is not needed, and the pressure fluid supplied to the ejector is simply consumed needlessly. Stated otherwise, with a conventional vacuum suction apparatus, a fixed amount of pressure fluid normally is required to be supplied continuously, regardless of the negative pressure condition supplied to the suction pad.

Accordingly, in recent years, there has been a demand to decrease the amount of pressure fluid consumed, as well as reduce the energy required, when a workpiece is attracted under suction.

SUMMARY OF THE INVENTION

A general object of the present invention is to provide a vacuum suction apparatus having a simple structure, in which excessive consumption of pressure fluid, during states when a workpiece is attracted under suction, can be prevented.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
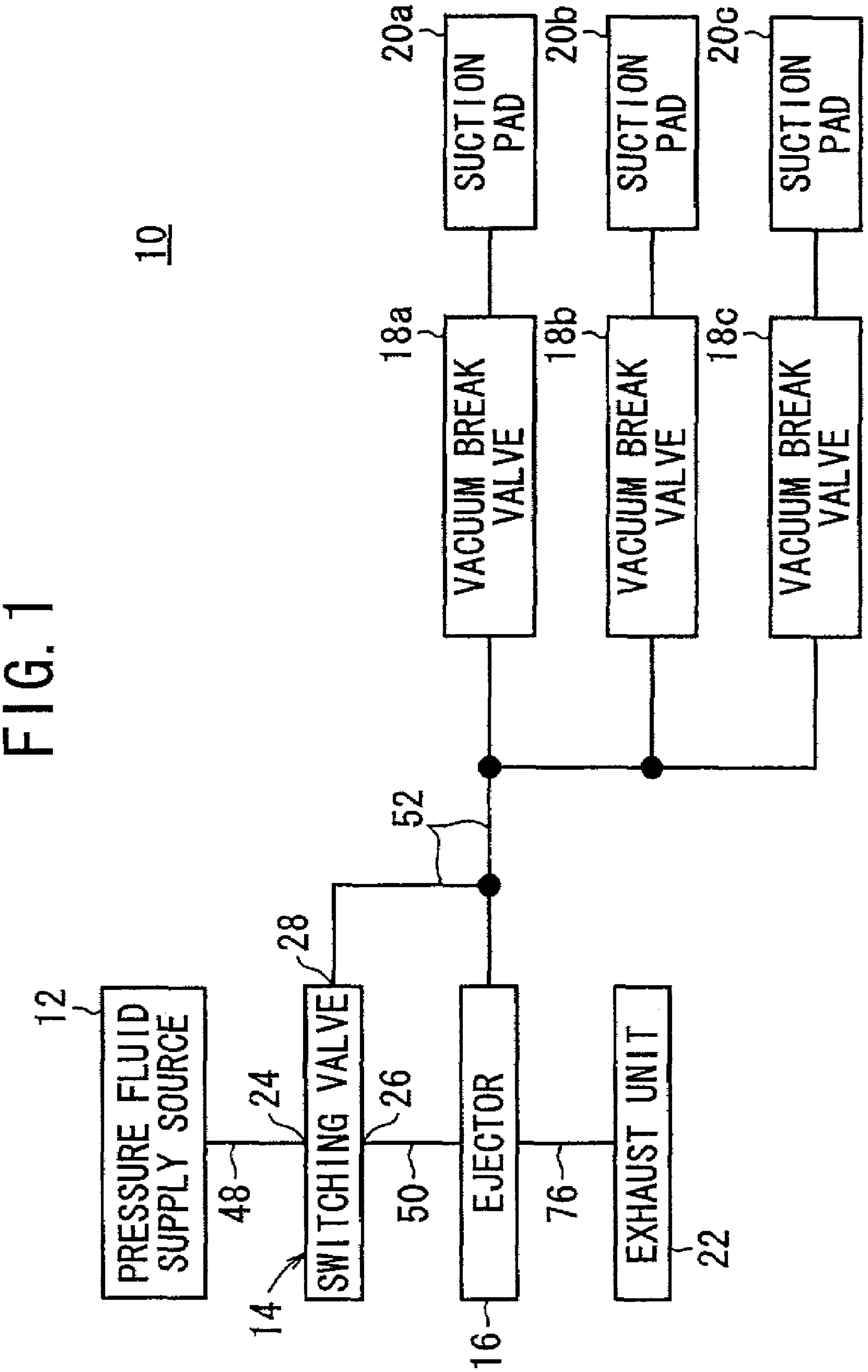
FIG. 1 is a schematic structural view of a vacuum suction apparatus according to a first embodiment of the present invention.

In FIG. 1, reference numeral 10 indicates a vacuum suction apparatus according to a first embodiment of the present invention.

The vacuum suction apparatus 10, as shown in FIGS. 1 to 4, includes a pressure fluid supply source 12 for supplying a pressure fluid, a switching valve (switching mechanism) 14 by which a supply state of the pressure fluid from the pressure fluid supply source 12 is switched, an ejector (vacuum generator) 16 connected to the switching valve 14 and which causes a negative pressure (vacuum pressure) to be generated from the pressure fluid, vacuum break valves 18*a,* 18*b,* 18*c* which cause the negative pressure generated by the ejector 16 to be restored to atmospheric pressure, suction pads (suction members) 20*a,* 20*b,* 20*c* connected with respect to the vacuum break valves 18*a,* 18*b,* 18*c* and which attract a workpiece (not shown) under suction by the supplied negative pressure, and an exhaust unit 22 that discharges the pressure fluid introduced into the ejector 16 to the outside.

Figure 2:
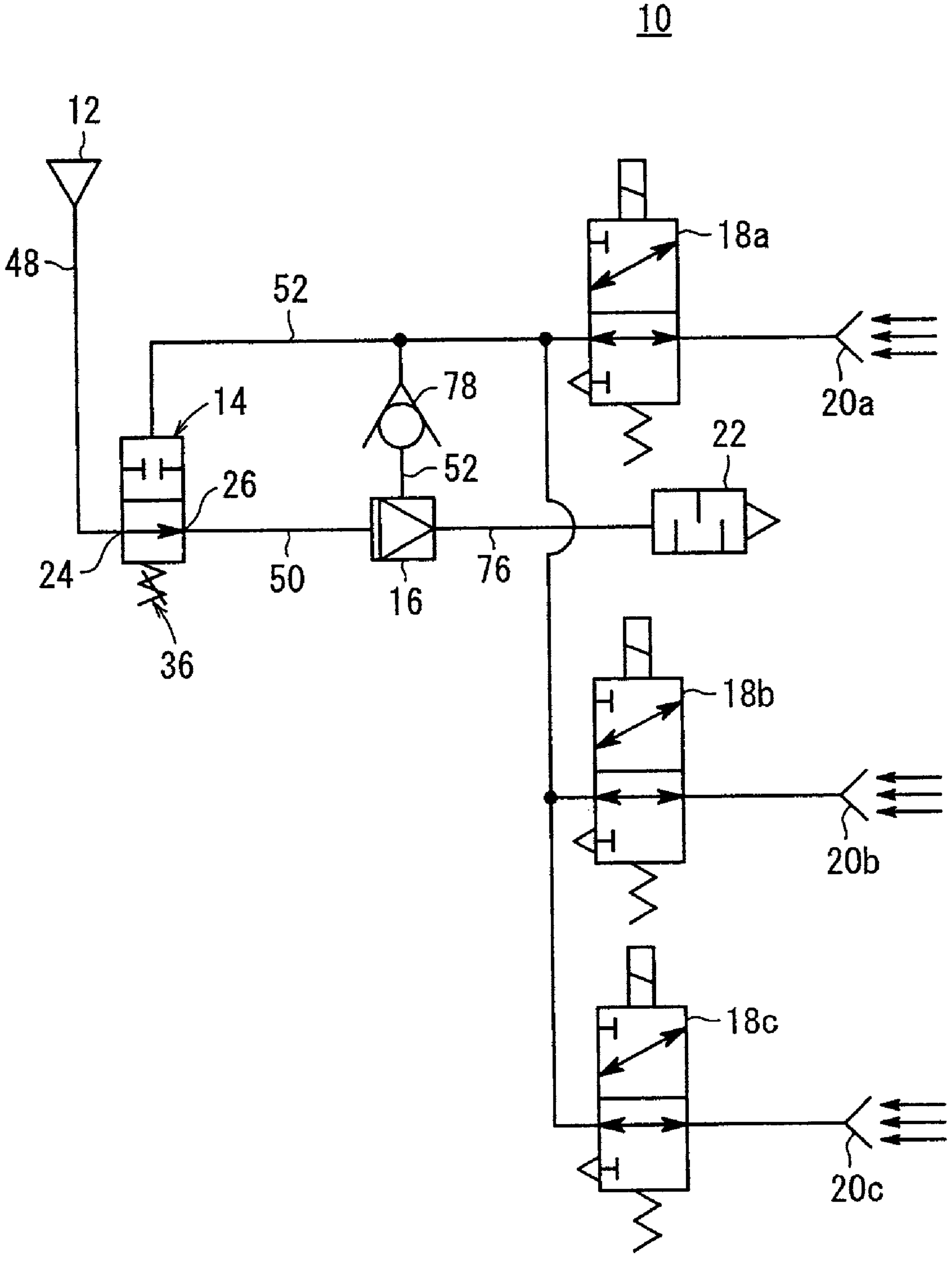
FIG. 2 is a schematic view of a fluid circuit of the vacuum suction apparatus shown in FIG. 1.

A case shall now be described in which, as shown in FIGS. 1 and 2, the vacuum break valves 18*a,* 18*b,* 18*c* and the suction pads 20*a,* 20*b,* 20*c* are connected respectively in parallel with respect to a negative pressure passage 52.

Figure 3:
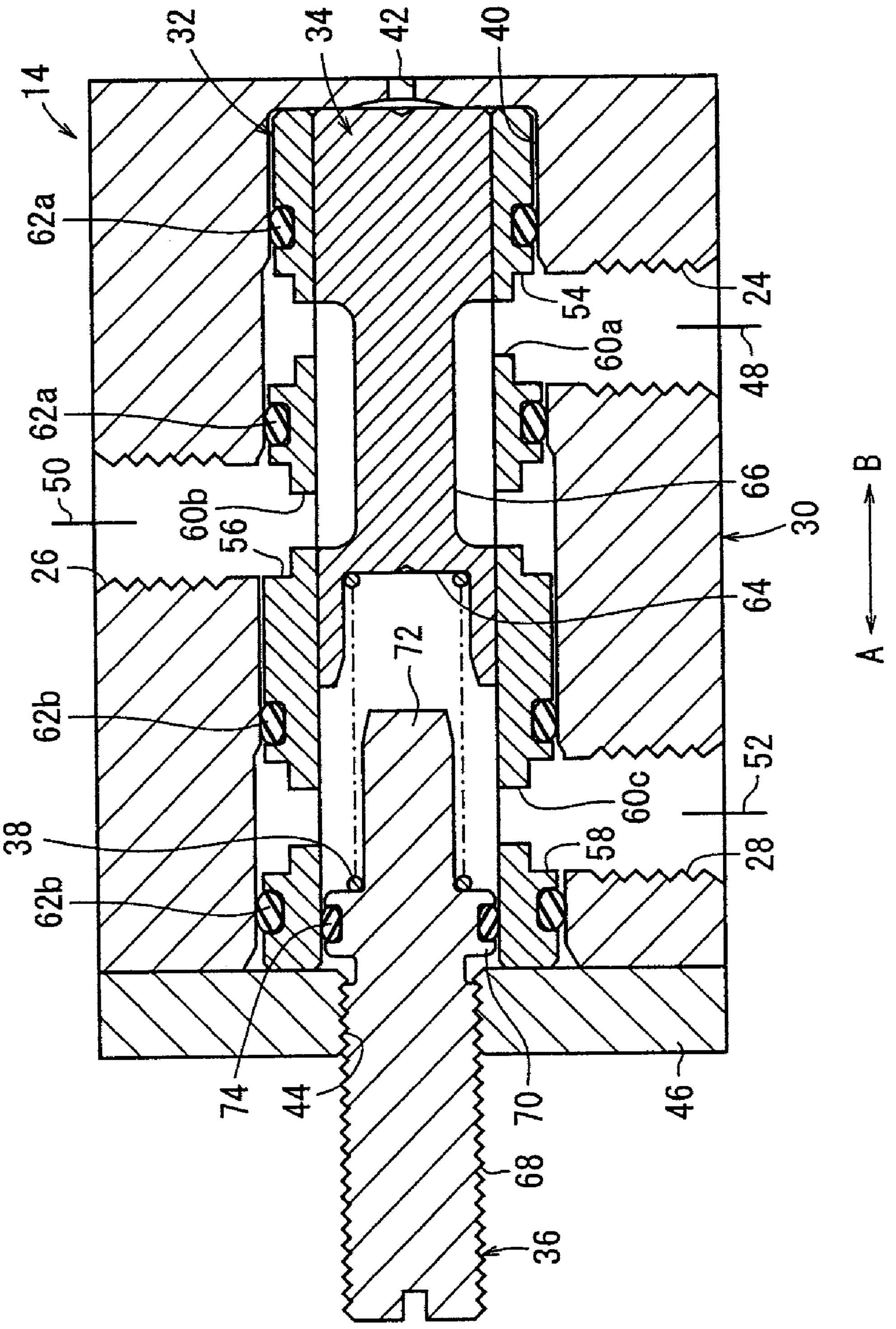
FIG. 3 is an overall vertical cross sectional view of a switching valve, which constitutes an element of the vacuum suction apparatus of FIG. 1.
Figure 4:
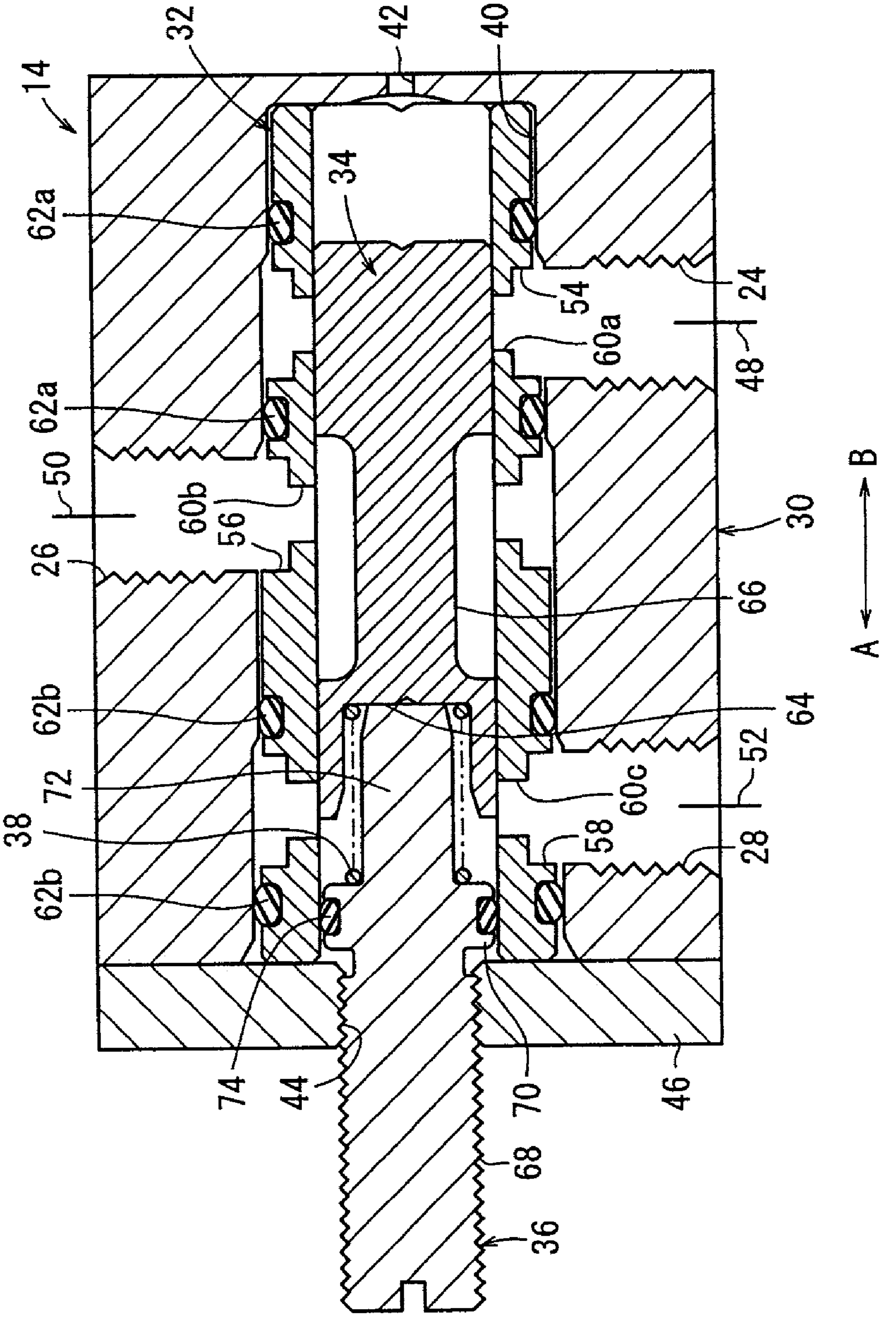
FIG. 4 is an overall vertical cross sectional view showing a state in which a valve body of the switching valve of FIG. 2 is displaced for blocking communication between a supply port and a outlet port.

As shown in FIGS. 3 and 4, the switching valve 14 comprises a valve body (body) 30, including a supply port (first port) 24, an outlet port (second part) 26, and a vacuum port (third port) 28.

The switching valve 14 further includes a valve body 34, which is disposed displaceably through a cylindrical body 32 installed inside of the valve body 30, an adjustment screw (adjustment mechanism) 36 by which the displacement amount of the valve body 34 can be adjusted, and a spring 38 interposed between the valve body 34 and the adjustment screw 36.

A through hole 40 that extends along an axial direction (the direction of arrows A and B) is formed at the interior of the valve body 30, and the cylindrical body 32 and the valve body 34 are disposed inside the through hole 40. The through hole 40 opens on one end side (in the direction of the arrow A) of the valve body 30, and further communicates with the exterior through an inlet/outlet port 42, which is formed in the other end side (in the direction of the arrow B) of the valve body 30. In addition, a cover plate 46 having a screw hole 44 therein is installed on one end of the valve body 30, whereby the one end of the through hole 40 is closed by the cover plate 46.

The supply port 24 opens and communicates with the through hole 40 on one side surface of the valve body 30, and the supply port 24 is connected to the pressure fluid supply source 12 through a supply passage 48.

Further, the outlet port 26 opens on the other side surface of the valve body 30 so as to communicate with the through hole 40. The outlet port 26 is arranged substantially centrally along the axial direction (the direction of arrows A and B) in the valve body 30. The outlet port 26 is connected to the ejector 16 through the outlet passage 50.

Further, the vacuum port 28 is formed on the one side surface of the valve body 30 while being separated a predetermined distance from the supply port 24. The vacuum port 28 communicates with the through hole 40 and is connected to the vacuum break valves 18*a*, 18*b*, 18*c* through the negative pressure passage 52.

The cylindrical body 32 is disposed so as to abut against an inner circumferential surface of the through hole 40. A first recess 54 which faces the supply port 24, a second recess 56 which faces the outlet port 26, and a third recess 58 which faces the vacuum port 28 are provided on the outer circumferential surface of the cylindrical body 32. The first through third recesses 54, 56, 58 are formed in an annularly recessed manner, at a predetermined depth with respect to the outer circumferential surface.

In addition, communication passages 60*a*, 60*b*, 60*c*, which penetrate through and toward the inner circumferential side of the cylindrical body 32, are formed respectively in the first through third recesses 54, 56, 58. The outer and inner circumferential sides of the cylindrical body 32 communicate through the communication passages 60*a*, 60*b*, 60*c*.

Furthermore, a pair of seal members 62*a*, 62*b* are disposed respectively into annular grooves that are formed on the outer circumferential surface of the cylindrical body 32 on both sides of the first and third recesses 54, 58. The seal members 62*a*, 62*b* abut against outer sides of the supply port 24 and the vacuum port 28 in the through hole 40. As a result, by means of the seal members 62*a*, 62*b*, leakage of pressure fluid that passes between the valve body 30 and the cylindrical body 32 is prevented.

More specifically, there is no outward leakage of the pressure fluid supplied to the first recesses 54 from the supply port 24. Outward leakage of the negative pressure introduced into the vacuum port 28 through the negative pressure passage 52 also is prevented.

The valve body 34 is arranged so as to abut against the inner circumferential surface of the cylindrical body 32. One end of the valve body 34, which is formed in the shape of a cylindrical pillar, is inserted into the other end side (in the direction of the arrow B) of the valve body 30, which is equipped with the supply port 24. The other end of the valve body 34 faces toward the one end side (in the direction of the arrow A) of the valve body 30, and is formed with an opened cylindrical shape having a spring receiving member 64 at the inside thereof.

Further, an annular recess 66 facing the inner circumferential surface of the cylindrical body 32 is formed in a substantially central portion of the valve body 34. The annular recess 66 is formed with a predetermined width along the axial direction (the direction of arrows A and B) of the valve body 34, and with a predetermined depth with respect to an outer circumferential surface of the valve body 34. The width dimension of the annular recess 66 is set so that the annular recess 66 faces respectively toward both the supply port 24 and the outlet port 26, with a size that enables mutual communication therebetween.

The adjustment screw 36 has a screw portion 68 that is screw-engaged with the screw hole 44 of the cover plate 46, a flange portion 70 disposed inside of the through hole 40 and expanded in width in a radial outward direction, and a guide portion 72, which is reduced in diameter with respect to the flange portion 70 and extends toward the side of the valve body 34. A seal ring 74 is installed via an annular groove on the outer circumferential surface of the flange portion 70. In addition, by rotating the adjustment screw 36, the adjustment screw 36 is displaceable so as to advance and retract along the axial direction (the direction of arrows A and B), through an engagement action of the screw portion 68 with the screw hole 44 of the cover plate 46.

Further, the spring 38 is installed onto the flange portion 70 between the flange portion 70 and the spring receiving member 64 of the valve body 34. The elastic force of the spring 38 is imposed in a direction (the direction of the arrow B) that urges the valve body 34 to separate away from the adjustment screw 36. More specifically, since the spring 38 is compressed by the adjustment screw 36 toward the valve body 34 (in the direction of the arrow B), by screw-rotating the adjustment screw 36 and displacing the adjustment screw 36 in the axial direction, the pressing force with respect to the spring 38 can be caused to change, thereby enabling the elastic force imposed from the spring 38 with respect to the valve body 34 to be adjustable.

Moreover, the spring 38 is guided along the axial direction (the direction of arrows A and B) by being inserted onto the outer circumferential side of the guide portion 72 making up the adjustment screw 36.

The ejector 16 is connected to the downstream side of the switching valve 14 through the outlet passage 50, and the pressure fluid, which is guided out through the outlet port 26 of the switching valve 14, is introduced to the ejector 16. The negative pressure generated in the ejector 16 passes through the negative pressure passage 52 and is directed out to the vacuum break valves 18*a*, 18*b*, 18*c*. Together therewith, the pressure fluid passes through the exhaust passage 76 and is directed out to the exhaust unit 22, where it is discharged to the outside.

Further, a check valve 78 (see FIG. 2) is disposed between the ejector 16 and the vacuum break valves 18*a*, 18*b*, 18*c*, wherein the check valve 78 is placed in a valve open state by the negative pressure generated by the ejector 16, such that the negative pressure passage 52 that connects the ejector 16 and the vacuum break valves 18*a*, 18*b*, 18*c* enables communication therebetween.

The vacuum suction apparatus 10 in accordance with the first embodiment of the present invention is constructed basically as described above. Next, operations and effects of the vacuum suction apparatus 10 shall be explained.

First, by supplying a pressure fluid from the pressure fluid supply source 12 to the supply passage 48, the pressure fluid passes through the supply port 24 and is introduced to the interior of the through hole 40 of the switching valve 14. In this case, due to the elastic force of the spring 38, because the valve body 34 is displaced in a direction (in the direction of the arrow B) separating away from the adjustment screw 36, the pressure fluid introduced into the supply port 24 is guided toward the outlet port 26 while passing through the annular recess 66 of the valve body 34. The pressure fluid then passes through the outlet passage 50 and is supplied to the ejector 16.

In this case, since the vacuum port 28 is closed by the valve body 34 and is in a non-communicative state with respect to the supply port 24 and the outlet port 26, the pressure fluid does not flow through the vacuum port 28.

In addition, the negative pressure generated in the ejector 16 passes through the negative pressure passage 52, reaching the respective vacuum break valves 18*a*, 18*b*, 18*c*, and is supplied respectively to the suction pads 20*a*, 20*b*, 20*c*. As a result, one or more workpieces (not shown) are attracted under suction and held by the suction pads 20*a*, 20*b*, 20*c*.

On the other hand, the pressure fluid supplied to the ejector 16, after passing through the exhaust passage 76 and being led to the exhaust unit 22, is discharged to the outside.

Next, after the workpiece is attracted by the suction pads 20*a*, 20*b*, 20*c*, since the pressure of the negative pressure rises with respect to the set pressure capable of attracting the workpiece under suction, the pressure of the negative pressure passage 52 to which the negative pressure is supplied becomes greater. As a result, the negative pressure that passes through the vacuum port 28 of the switching valve 14, which is in a state of communication with the negative pressure passage 52, is supplied to the through hole 40, whereupon the valve body 34 is pulled toward the side of the adjustment screw 36 (in the direction of the arrow A) against the elastic force of the spring 38 (see FIG. 4). As a result thereof, the supply port 24 is blocked by the one end of the valve body 34, and communication between the supply port 24 and the outlet port 26 is interrupted. Owing thereto, supply of the pressure fluid that passes through the supply port 24 and the outlet port 26 to the ejector 16 is interrupted, and the negative pressure in the suction pads 20*a*, 20*b*, 20*c* which attract the workpiece is maintained at a substantially constant pressure (refer to the solid line shown in FIG. 5).

Figure 5:
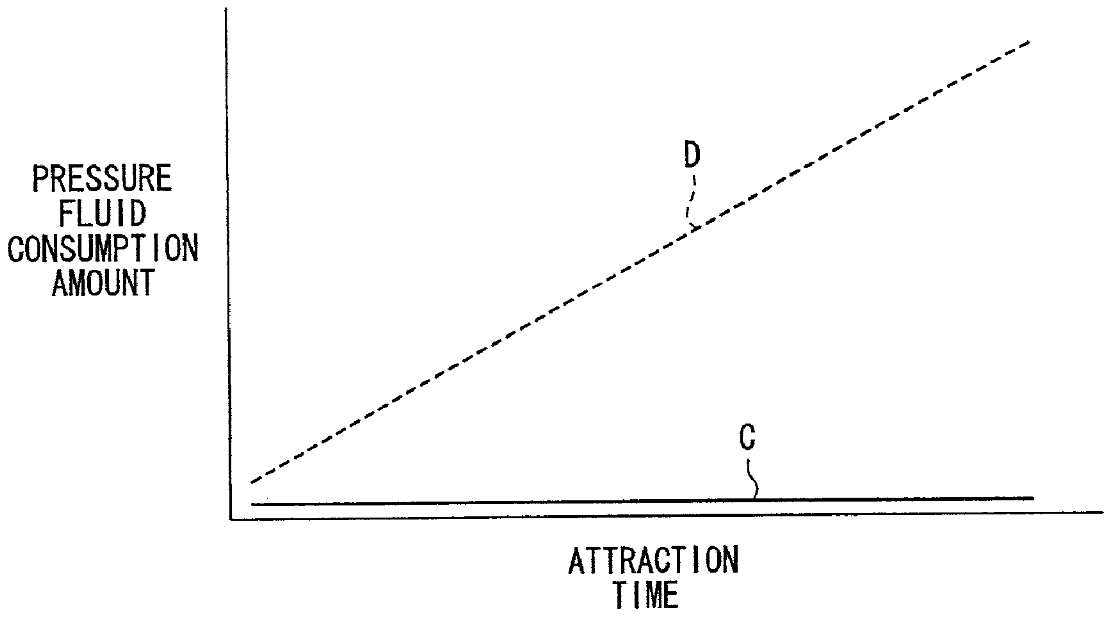
FIG. 5 is a graph of a characteristic curve showing the relationship between a pressure fluid consumption amount in the vacuum suction apparatus and the attraction time.

A brief explanation shall be made, with reference to FIG. 5, concerning the relationship between the consumption amount of the pressure fluid and the attraction time for which the workpiece is attracted by the suction pads in the vacuum suction apparatus. The solid line C in FIG. 5 shows the characteristics of the vacuum suction apparatus 10 according to the present embodiment, whereas the broken line D in FIG. 5 shows the characteristics of a conventional vacuum suction apparatus.

In the conventional vacuum suction apparatus, as shown by the broken line D of FIG. 5, it is appreciated that as the attraction time during which the workpiece is attracted by the suction pad increases, the consumption amount of the pressure fluid increases proportionally. Stated otherwise, even in states where the suction pad has already attracted the workpiece, the pressure fluid continues to be supplied in an ongoing manner.

In contrast thereto, in the vacuum suction apparatus 10 according to the first embodiment, in a state where the workpiece has been attracted under suction by the suction pads 20*a*, 20*b*, 20*c*, as a result of a switching action of the switching valve 14, the supply of pressure fluid is interrupted, so that as shown by the solid line in FIG. 5, even as the attraction time by the suction pads 20*a*, 20*b*, 20*c* increases, the consumption amount of the pressure fluid remains substantially constant.

Further, the elastic force of the spring 38 can be adjusted optionally, by rotating and displacing the adjustment screw 36, so as to adjust the distance between the adjustment screw 36 and the valve body 34.

For example, in case one desires to increase the set pressure of the negative pressure supplied to the suction pads 20*a*, 20*b*, 20*c*, the adjustment screw 36 is screw-rotated so as to be displaced toward the valve body 34 (in the direction of the arrow B), and thus by compressing the spring 38 between the adjustment screw 36 and the valve body 34, the elastic force produced by the spring 38 can be increased.

As a result, a larger displacing force is required when the valve body 34 is displaced toward the side of the adjustment screw 36 (in the direction of the arrow A) against the elastic force of the spring 38. More specifically, the valve body 34 is not displaced until the pulling force imposed on the valve body 34 by the negative pressure becomes sufficiently large, and until this occurs, the communicative state of the supply port 24 and the outlet port 26 is maintained by the valve body 34. Thus, the pressure force of the negative pressure supplied to the suction pads 20*a*, 20*b*, 20*c* becomes greater.

In addition, after the workpiece attracted by the suction pads 20*a*, 20*b*, 20*c* has been transported, when the attraction of the workpiece is released, the vacuum break valves 18*a*, 18*b*, 18*c* are operated such that the negative pressure passage 52 communicates with the outside, and accordingly, since the negative pressure within the negative pressure passage 52 becomes the same as atmospheric pressure, supply of the negative pressure to the suction pads 20*a*, 20*b*, 20*c* is halted, and the state of attraction of the workpiece is released.

On the other hand, in the event that the pressure force of the negative pressure in the suction pads 20*a*, 20*b*, 20*c* falls below a set pressure while the workpiece is attracted thereto, the elastic force of the spring 38 overcomes the pressure force of the negative pressure, and the valve body 34 is pressed in a direction (the direction of the arrow B) to separate away from the adjustment screw 36. Owing thereto, the supply port 24 and the outlet port 26 are again brought into communication with each other through the annular recess 66, and since pressure fluid is supplied to the ejector 16 through the outlet passage 50, a negative pressure is generated and supplied respectively to the suction pads 20*a*, 20*b*, 20*c*. As a result, the pressure force of the negative pressure inside the suction pads 20*a*, 20*b*, 20*c* is maintained at a predetermined set pressure.

In the foregoing manner, according to the first embodiment, the switching valve 14 is disposed between the pressure fluid supply source 12 and the ejector 16. After a workpiece has been attracted by the suction pads 20*a*, 20*b*, 20*c*, the valve body 34 of the switching valve 14 is caused to be displaced by the negative pressure generated by the ejector 16, and communication between the pressure fluid supply source 12 and the ejector 16 is interrupted. Accordingly, while the workpiece is in an attracted state, supply of pressure fluid to the ejector 16 can be halted and the workpiece can be kept in a held state.

In this manner, utilizing a simple structure in which the switching valve 14 is disposed in the supply passage 48 for supplying the pressure fluid, extraneous consumption of the pressure fluid after the workpiece has been attracted is prevented, and the consumption amount can be suppressed. As a result, the energy efficiency of the vacuum suction apparatus 10 can be promoted significantly.

Further, because the switching valve 14 can be constructed from the valve body 30 having the supply port 24, the outlet port 26 and the vacuum port 28, along with the valve body 34, which is disposed displaceably through the cylindrical body 32 installed in the valve body 30, the adjustment screw 36 that enables the displacement amount of the valve body 34 to be adjusted, and the spring 38 which is mounted between the valve body 34 and the adjustment screw 36, the consumed amount of pressure fluid can be suppressed without enlarging the scale of the vacuum suction apparatus 10.

Furthermore, because the displacement timing of the valve body 34 can optionally be adjusted by providing the adjustment screw 36 in the switching valve 14, the communicative state between the pressure fluid supply source 12 and the ejector 16 can be interrupted at a desired timing, and along therewith, the set pressure of the negative pressure supplied to the suction pads 20*a*, 20*b*, 20*c* can freely be set. As a result, the workpiece can appropriately and easily be attracted at a desired set pressure, which corresponds to the size and weight of the workpiece attracted by the suction pads 20*a*, 20*b*, 20*c*.

Still further, compared to a conventional vacuum suction apparatus, since the flow volume of the pressure fluid that flows through the vacuum suction apparatus 10 can be reduced, noises produced upon discharging of the pressure fluid from the exhaust unit 22 are reduced. Along therewith, for example, clogging of a silencer, which may be provided to reduce such noises, is suppressed.

Still further, by disposing an air tank (not shown) in the negative pressure passage 52 on a downstream side of the ejector 16, the apparatus can be substituted for a vacuum pump.

In the vacuum suction apparatus 10 according to the above-described first embodiment, an explanation has been made in which three suction pads 20*a*, 20*b*, 20*c* and three vacuum break valves 18*a*, 18*b*, 18*c* are provided. However, the invention is not limited to such a configuration. The actual quantity of suction pads and vacuum break valves, which are connected in parallel with respect to the negative pressure passage 52 connected to the ejector 16, and through which the negative pressure is supplied, is not limited.

Figure 6:
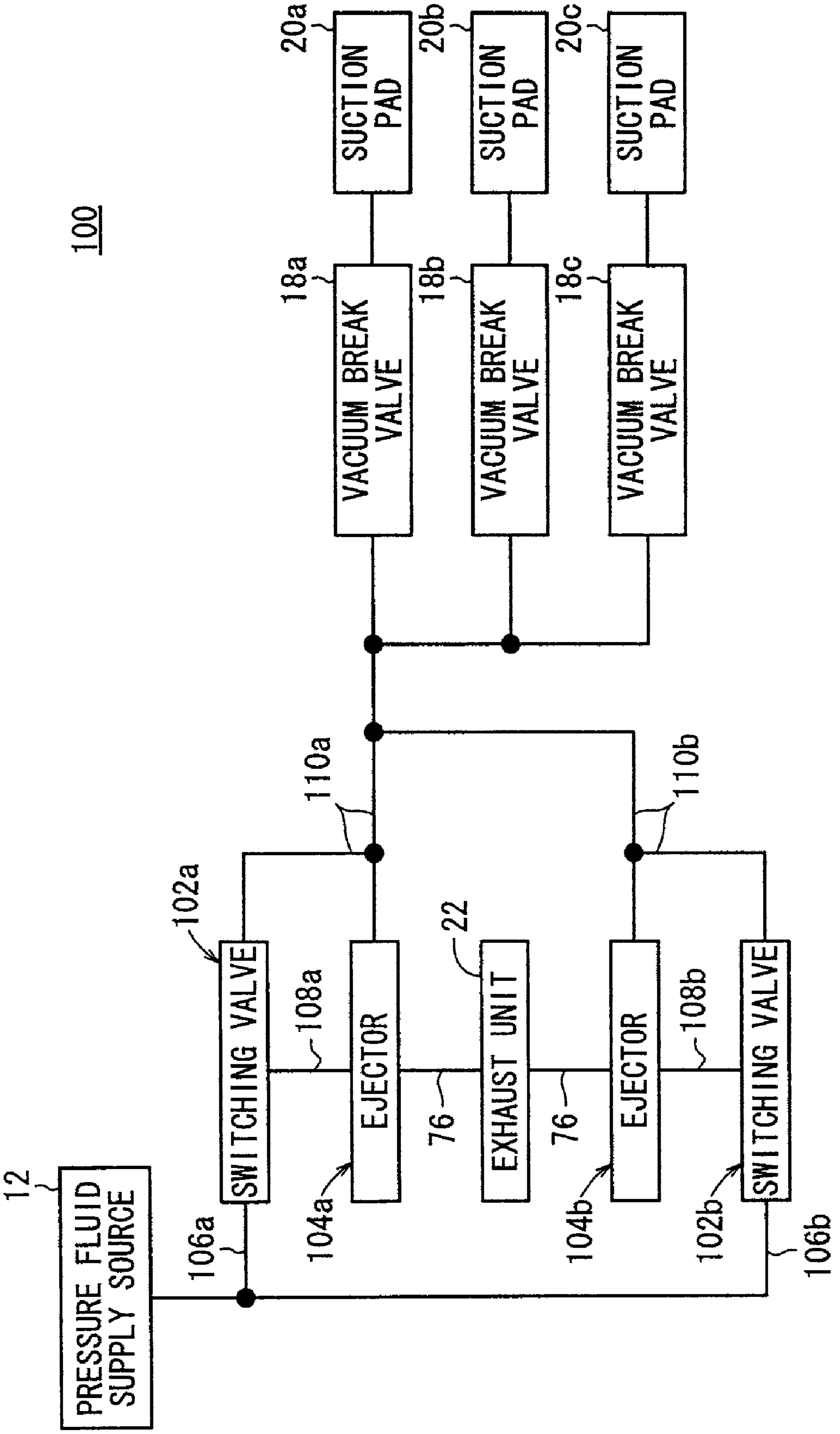
FIG. 6 is a schematic structural view of a vacuum suction apparatus according to a second embodiment.

Next, a vacuum suction apparatus 100 according to a second embodiment is shown in FIG. 6. Structural elements thereof, which are the same as those of the vacuum suction apparatus 10 according to the first embodiment, are designated using the same reference numerals and detailed explanations of such features shall be omitted.

The vacuum suction apparatus 100 according to the second embodiment differs from the vacuum suction apparatus 10 of the first embodiment, in that a pair of switching valves 102*a*, 102*b* and a pair of ejectors 104*a*, 104*b* are disposed between the pressure fluid supply source 12 and the suction pads 20*a*, 20*b*, 20*c*, wherein negative pressures generated by the ejectors 104*a*, 104*b* are supplied respectively to the suction pads 20*a*, 20*b*, 20*c*.

As shown in FIG. 6, the pair of switching valves 102*a*, 102*b* are connected respectively with respect to supply passages 106*a*, 106*b*, which are connected to the pressure fluid supply source 12. The switching valves 102*a*, 102*b* are connected respectively to the ejectors 104*a*, 104*b* through outlet passages 108*a*, 108*b* that are connected to the outlet ports 26 of the switching valves 102*a*, 102*b*.

Further, negative pressure passages 110*a*, 110*b* are connected respectively to the pair of ejectors 104*a*, 104*b*. A negative pressure passages 110*a* connected to the one ejector 104*a* is connected with the negative pressure passage 110*b* that is connected to the other ejector 104*b*. More specifically, the negative pressures generated by the pair of ejectors 104*a*, 104*b* are supplied respectively to negative pressure passages 110*a*, 110*b* and the flows therefrom are combined, whereupon the negative pressure passes through the vacuum break valves 18*a*, 18*b*, 18*c* and is supplied respectively to the suction pads 20*a*, 20*b*, 20*c*. Moreover, the pressure fluid supplied to the ejectors 104*a*, 104*b* passes through the exhaust passage 76 and, after having been directed to the exhaust unit 22, is discharged to the outside.

In this manner, with the vacuum suction apparatus 100 according to the second embodiment, by providing a plurality of ejectors 104*a*, 104*b*, a sufficient negative pressure can be supplied, even when a suction apparatus having multiple suction pads 20*a*, 20*b*, 20*c* or the like is provided. Along therewith, through adjusting the adjusting screws 36 disposed in the switching valves 102*a*, 102*b*, the plural ejectors 104*a*, 104*b* can be used selectively, corresponding to the necessary amount of supplied negative pressure. Owing thereto, the consumption amount of the pressure fluid can be even further reduced in the vacuum suction apparatus 100, and wasteful expenditures can be prevented.

In the above-mentioned vacuum suction apparatus 100 according to the second embodiment, a case has been described in which the switching valves 102*a*, 102*b* and the ejectors 104*a*, 104*b* are provided in pairs. However, the invention is not limited to this feature. Insofar as any plurality of switching valves are connected in parallel with respect to supply passages that are connected to the pressure fluid supply source 12, and ejectors are connected respectively with respect to the switching valves, the quantity thereof is not particularly limited.

Further, the vacuum suction apparatus according to the present invention is not limited to the aforementioned embodiments, and various structures may be adopted therein as a matter of course, which do not deviate from the essential features and gist of the invention.

What is claimed is:

1. A vacuum suction apparatus comprising:

a pressure fluid supply source for supplying a pressure fluid;

a vacuum generator comprising an ejector for generating a negative pressure by supplying said pressure fluid thereto from said pressure fluid supply source;

a suction member to which the negative pressure from said vacuum generator is supplied, and which is capable of attracting a workpiece under suction by said negative pressure; and a switching mechanism connected to said vacuum generator for switching a communication state of a passage through which said pressure fluid is supplied from said pressure fluid supply source to said vacuum generator, corresponding to a negative pressure state supplied to said suction member, wherein said switching mechanism comprises:

a body, having a first port through which said pressure fluid is supplied, a second port connected to said vacuum generator and through which said pressure fluid is led out, and a third port connected to a negative pressure passage through which the negative pressure generated by said vacuum generator flows; and a switching valve comprising a valve body disposed inside said body so as to be displaceable along an axial direction, said valve body changing a communication state between said first port and said second port, wherein, when a workpiece is attracted under suction by said negative pressure and a predetermined pressure is reached inside said suction member, the communication state of said passage is interrupted under a switching action by said switching mechanism, and supply of said pressure fluid to said vacuum generator is discontinued, and wherein said switching valve includes a spring that imposes an elastic force on said valve body, said spring maintaining said valve body in a state of communication between said first port and said second port, and wherein communication between said first port and said second port is blocked by displacement of said valve body by said negative pressure, against the elastic force of said spring.

2. The vacuum suction apparatus according to claim 1, wherein said switching valve further comprises an adjustment mechanism capable of adjusting the elastic force of the spring imposed on said valve body.

3. The vacuum suction apparatus according to claim 2, further comprising a cylindrical guide body disposed in said body, said valve body being disposed displaceably along the axial direction inside said guide body.

4. The vacuum suction apparatus according to claim 3, wherein communication passages are provided in said guide body, penetrating in a radial direction and communicating between exterior and interior portions of said guide body, and wherein said communication passages are disposed at positions confronting said first through third ports.

5. The vacuum suction apparatus according to claim 4, wherein a recess, which is recessed while facing at least one of said first and second ports, is provided on an outer circumferential surface of said valve body, said first port and said second port communicating through said recess.

6. The vacuum suction apparatus according to claim 1, wherein said switching mechanism and said vacuum generator are disposed respectively in pairs.

* * * * *